May 30, 1972     C. L. WRIGHT     3,666,620
TREATMENT OF BAGASSE WITH A NONTOXIC FUNGICIDAL ACID
TO PREVENT MYCELIAL DETERIORATION
Filed Oct. 13, 1969
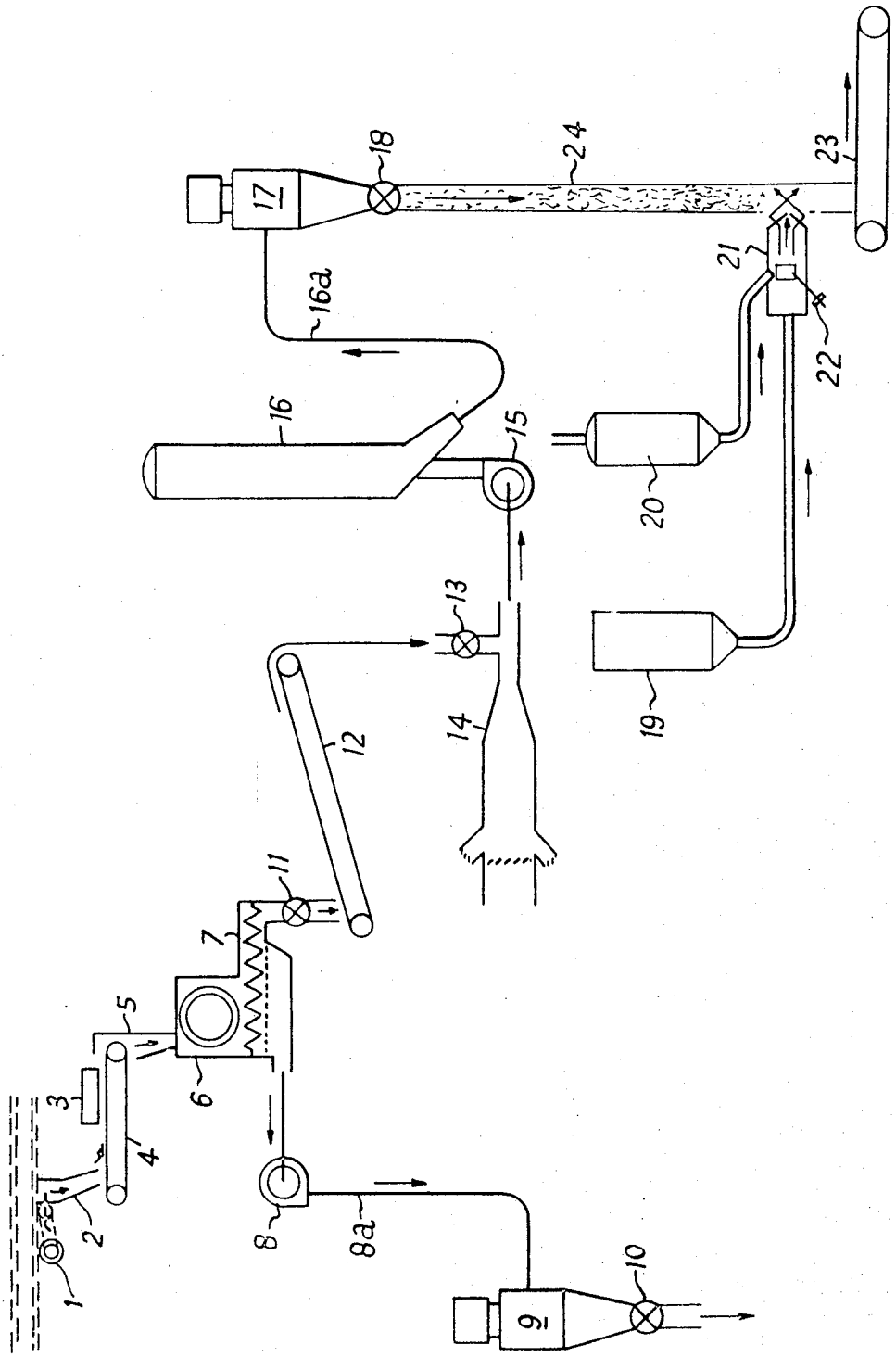
CHARLES LEONARD WRIGHT, Inventor
By Wendworth Lind & Ponack
Attorneys

United States Patent Office

3,666,620
Patented May 30, 1972

---

3,666,620
TREATMENT OF BAGASSE WITH A NONTOXIC FUNGICIDAL ACID TO PREVENT MYCELIAL DETERIORATION
Charles Leonard Wright, 42 Woodlands Ave., New Malden, Surrey, England
Filed Oct. 13, 1969, Ser. No. 865,713
Claims priority, application Great Britain, Oct. 16, 1968, 49,162/68
Int. Cl. D21c 1/04
U.S. Cl. 162—76                    8 Claims

ABSTRACT OF THE DISCLOSURE

Bagasse intended for the production of chip board is stabilised against mycelial deterioration in storage by treating fresh bagasse from a sugar mill, after reducing the moisture content to below 50% of the weight thereof, with a nontoxic fungicidal acid in the liquid phase in an amount which reduces the pH of the treated material to 4.5 or below, preferably 3.5 to 4.5. The preferred acids are formic, acetic and propionic acids.

---

This invention relates to the treatment of bagasse to render it substantially free from deterioration on storage.

Bagasse is the essentially cellulosic and ligneous residue obtained after the extraction of sugar from sugar cane, viz July to December. The consequent intermittent lose and lignin in substantially the same proportions as most kinds of wood. As a result attempts have recently been made to convert bagasse into particle board (see Hesch "Particle Board From Sugar Cane," "Board Manufacture," April 1967). Such a process has only been satisfactorily carried on during the harvesting season for cane, viz. July to December. The consequent intermittent operation of the necessary plant is undesirable and expensive and accordingly attempts have been made to store bagasse for processing during the season when no freshly harvested product is available. An attempt to do this is described in B.R.P. No. 1,214,620 according to which the bagasse is dried, for example, with hot air, then milled, compressed into briquettes, stored until required for use, again milled to break up the briquettes and then submitted to the normal processing involved in compressed cellulosic board manufacture. In operating this process it is pointed out that it is necessary to protect the personnel operating the process from the marked health hazards associated with the handling of bagasse by operating with a closed system. However, it is not possible to work with a closed system during the spreading of the mattress of fibre which constitutes the first stage in the formation of a compressed particle board.

A process is also known for the treatment and storage of bagasse intended for use in the production of paper pulp (U.S. Pat. No. 2,960,444). This process involves saturating fresh bagasse, preferably straight from the sugar mill, with an aaqueous mixture of two cultures of Lactobacilli thus producing an impregnated mass containing 75–80% of aqueous liquid and 25–20% of dry materials. This material is stacked and, if preservation only is required, compacted and any surplus liquid allowed to drain therefrom. Alternatively it may first be allowed to digest so as to soften and loosen the pectopentosans and lignins prior to treatment in chemical digesters. This process leads to the leaching out of the water-soluble substances, such as the residual sugars, present in the bagasse and, in consequence, there is some fermentation. As a result some lactic acid is gradually formed which, in view of the high ratio of liquids to solids, is very dilute. The resulting product is quite suitable for use in the production of paper pulp since the fibres become loosened from the incrustants but it is not directly useful for other purposes such as the production of particle board.

The health hazard arising in the handling of bagasse is encountered in handling dry or substantially dry materials. It is a serious hazard and gives rise to the condition known as "bagassosis" which may even prove fatal, whilst the briquetting process referred to above is not an entirely satisfactory one if it is intended to use the whole of the fibrous briquetted material for particle board production. Difficulty arises from the fact that the pressures customarily used in briquetting have been so high that either in the actual briquetting operation or in the subsequent remilling of the briquetted material, or in both, the proportion of fine, short fibres produced has been too great to enable a high quality compressed particle board to be produced.

Bagassosis affects the lungs of patients and gives rise to dyspnoea. It is now known that this condition arises from the inhaling of bacteria and yeasts emanating from the bagasse; these organisms lodge in the base of the lungs giving rise to extrinsic allergic alveolitis (vide "The Lancet," Mar. 23, 1968, page 619).

When bagasse is processed immediately after extraction of sugar no difficulty has been encountered. When bagasse is stored, however, it has to be taken into account that it has a residual sugar content of the order of 3% by weight and that the conditions of storage have been at the relatively high temperatures normally encountered in the tropical countries in which sugar cane grows. These conditions favour the growth of bacteria and fungi. A further factor affecting the growth of bacteria and fungi is the availability of oxygen, i.e. aerobic conditions. The high compression favoured in the briquetting process described above limits the availability of oxygen other than to the cellulosic material on the surface of the briquettes yet even under these conditions a serious health hazard has been recognized to exist.

It is an object of the present invention to provide an improved process for the treatment of bagasse and more especially for the treatment of bagasse which is to be stored prior to forming into cellulosic chip board or other compacted cellulosic materials.

In accordance with the present invention there is provided a process for the stabilisation of bagasse against mycelial deterioration which comprises substantially uniformly treating bagasse having a moisture content of less than 50% of the weight of the damp material with a non-toxic fungicidal acid in the liquid phase in such an amount as to reduce the average pH thereof to 4.5 or below.

Whilst the present invention is primarily directed to the production of bagasse in the form of fibrous chips suitable for use in the production of particle board it is not limited thereto, since the treated bagasse is rendered more suitable for use in other environments in which bagasse has been or can be used.

As already mentioned bagasse is a product obtained in the extraction of sugar from sugar cane. The sugar cane has first to be grown in plantations. At the harvesting stage the mature sugar cane has an outer sheath which resists the action of moulds, yeast spores and bacteria which may collect upon the external surface of this sheath. As soon as the sugar cane is harvested and masticated to enable the sugar to be extracted therefrom, this outer sheath is no longer available to perform its natural function and in the extraction process not only are conditions favourable for the moulds, yeasts and bacteria to multiply, but the moulds, yeasts and bacteria become uniformly distributed throughout the mass of material undergoing extraction. As a result thereof the resulting mass bagasse has uniformly distributed therethrough a very considerable number of moulds, yeasts and bacteria which are indigenous to the area in which the sugar cane has grown. In general the conditions prevailing in sugar cane growing areas will continue to favour the growth of the moulds, yeasts and bacteria which explains why most samples shipped to Great Britain and other temperate countries for examination have been found to be mouldy, unless special precautions have been taken to prevent this happening.

Whilst a considerable number of different species of moulds, yeasts and bacteria have been shown to be present there is evidence that two or three groups are of particular importance. One group are the paecilomyces and sporotricha which are known to attack cellulose. A second group, which are suspected of being involved in causing bagassosis, are species of Thermoactinomyces, especially *T. vulgaris*, species of Aspergillus, especially *A. fumigatus*, special of Absidia and species of "thin" actinomyces which have not yet been identified.

When bagasse which has been stored for some days is shaken, large numbers of spores are liberated. Under conditions of milling preparatory to manufacture of fibre board, these spores have been trapped in the surrounding air and shown to be present in a concentration of up to $10^9$ per cubic metre of air. Thus, in a continuous process of milling high concentrations of spores can be expected to be present in the air surrounding the plant using stored bagasse. Such a high concentration of spores constitutes a serious health hazard.

There are thus at least two groups of moulds, yeasts and bacteria which need to be combatted in any process for preserving bagasse substantially free from deterioration. One group which attacks the cellulosic structure of the bagasse fibres and a second group which is responsible for generating the spores which, when inhaled by humans, give rise to bagassosis. It has been found that both types can be combatted by substantially uniform impregnation of bagasse with a non-toxic fungicidal acid. By reducing the overall pH of the bagassse to 4.5 or below, preferably to below 4.2, not only are the conditions within and about the individual fibres changed so that the moulds, yeasts and bacteria are no longer able to multiply readily, but the fungicidal nature of the acid employed in accordance with the invention ensures that the moulds, yeasts and bacteria present are unable to multiply.

Bagasse, after extraction of sugar, still contains about 3.5% by weight of residual sugar and has a pH of about 5.7. In addition it has a very high water content. The water content can readily be reduced, but it is difficult to remove the sugar and it has now been found that the only satisfactory way to approach the problem of stabilisation is by the use of a fungicidal acid. This approach is acceptable since most cellulosic materials of natural origin, e.g. wood, have a pH lower than 5.7. It is interesting to note that heating the bagasse to temperatures which would normally kill most bacteria and fungi is unsatisfactory because the heat-resistant Thermoactinomyces will survive temperatures of about 100 C. which is higher than the maximum that can safely be used on bagasse.

The treatment with non-toxic fungicidal acid should be carried out without the water content of the bagasse having been reduced to so low a value that permanent changes in the structure of the cell walls of the fibres have occurred. It is important that the cell structure of the bagasse remain such that the applied acid can permeate the cell walls. On the other hand, an unduly high moisture content should be avoided, since this would then act as a source of needless dilution to the acid. Some reduction in the mositure content of bagasse from a sugar extraction plant is desirable and, as a practical matter, a moisture content of less than 50% of the weight of the damp fibres is desirable. A preferred moisture content prior to treatment with acid is 20–40%, i.e. 80–60% of bagasse solids and 20–40% of water. When a cellulosic board material is being produced the reduction in moisture content may conveniently be achieved in two stages. One of these stages precedes the application of acid to the cellulosic material whilst the second stage precedes the preparation of the material for glueing prior to board formation. In the first of these stages there can be a reduction by drying of about 22 to 35% depending upon the moisture content of the raw material used.

The acid treatment will depend to some extent on the kind of acid used. Thus, treatment may be with an anhydrous liquid acid or with an aqueous or organic solvent solution of such an acid. Whilst an inorganic non-toxic fungicidal acid, such as phosphoric acid, may be used in aqueous solution, it is preferred to use an organic non-toxic fungicidal acid. Particular preferred organic acids are those alkane monocarboxylic acids which are liquid at room tepreatures or which are miscible with water over a wide range of proportions, especially formic, acetic and propionic acids. Formic and propionic acids are especially preferred. Other organic acids which may be used in organic solvent solution include aliphatic dienic monocarboxylic acids such as sorbic acid and aromatic monocyclic monocarboxylic acids, such as benzoic, phenylacetic and para-hydroxybenzoic acids.

With respect to the amount of such acid this should be sufficient to reduce the pH of the treated bagasse to 4.5 or below, pH's in the range of 3.7 to 4.2 being preferred: pH values lower than 3.5 are unnecessary for the present purpose. As a rule this can be achieved by the application of 1 to 3% by weight of acid based on the solids content of the material undergoing treatment. Such amounts of acid have been found to be sufficient to prevent the growth of the micro-organisms known to be present.

With regard to the manner of impregnation of the bagasse with acid, this is conveniently done in a tower to the top of which the bagasse is fed. Liquid acid or acid in solution may then be sprayed onto and into the fibrous chips as they are allowed to fall. For uniform impregnation spraying from several different directions into the falling mass is desirable. Such treatment is best applied after depithing the bagasse and treatment in a mill which reduces the length of the fibres thus producing a kind of fibrous chip, when the material is to be used in board manufacture. By depithing I means removal of the internal pith: the incrusting material comprising lignin which binds the cellulosic fibres together is not removed in the present process. From the fibrous chip-producing mill the material can be transported to the top of a treating tower by means of a transport fan. The material is then passed to suitable baling means. Since the preferred procedure is to reduce the material to desired fibre lengths prior to treatment with acid, the baling operation is desirably carried out at such pressures that little further reduction in length of the fibrous chips occurs in the combined baling and subsequent bale-breaking operation. A modest proportion of short length fibre materials is desirable in board manufacture for surfacing.

Treatment with acid as described also means that in board manufacture a separate addition of an acid catalyst to act as a curing agent for the thermosetting resin used as adhesive is no longer necessary. The resinous condensation products usually used for this purpose are the aminoplasts, especially dimethylolurea condensation products.

The treatment in accordance with the invention enables stronger chip boards to be made than can be made from bagasse which has otherwise been subject to the same treatments, including storega for equal periods after baling. This is shown by the following figures which were obtained on a chip bagasse material which had first been dried to 3-5% moisture content and then resinated by normal particle board technique using 8% of resin solids based upon the solids content of the bagasse in 50% aqueous solution. A commercial urea-formaldehyde resinous condensation product was used as bonding agent whilst pressing was at 160° C. using a pressing cycle of 5 minutes at 200 p.s.i., 2.5 minutes at 100 p.s.i., and 2.5 minutes at 50 p.s.i.

| Treatment | Untreated | 2% w./w. propionic acid |
|---|---|---|
| pH of bagasse | 5.8 | 4.1 |
| Density of board, lbs./ft.³ | 37.5 | 37.5 |
| Thickness of board, millimetres | 18 | 18 |
| Screw holding, lbs./in.²: | | |
| (a) Edge | 65.5 | 96 |
| (b) Face | 120.0 | 165 |
| Internal bond, lbs./in.² | 65.2 | 98 |

When the same tests were repeated after storing specimens of the boards for 6 months, the results obtained indicated a deterioration of 17.2% in the untreated board but only 2.1% in the treated board.

The improvement in the condition of the cellulose due to the acid treatment of the bagasse fibres is apparent from the approximately 40% improvement in the screw holding and a 50% improvement in the internal bond. Since the conditions of formation of the boards were the same the whole of this improvement must be attributed to the propionic acid treatment.

The treatment is accordance with the invention also produces an improved bagasse for use as a disposable bedding or flooring material for animals and poultry. The hitherto available material has been a source of infection and various allergies but the acid-treated material keeps the animals and poultry in a much more healthy condition.

It will be apparent that treatment with a non-toxic fungicidal acid in accordance with the invention has a marked effect on the moulds, yeasts and bacteria present in bagasse. Separate tests reveal that only a few bacteria and mould spores and substantially no yeast spores survive the treatment of this invention. The treated material is thus very much safer for human beings who happen to be present where it is being processed provided that it is stored under conditions which ensure retention of its acid content. In addition it is not degraded in storage.

In carrying out one form of the present process which is illustrated in the accompanying drawing, fresh bagasse from a sugar mill, containing about 50% of its weight of water, is taken from a conveyor by means of an automatic gate 1 and chute 2 and is fed on to a belt conveyor 4 which is provided with a magnetic separator 3. From conveyor 4 the material passes down a feed hopper 5 to a rotary depither 6 and screening device 7. In the screening device loose pith and very fine cellulosic material are separated: approximately 15% of the material is separated in this way and this is drawn off by means of a fan 8 along a pipe 8a to cyclone 9 equipped with a rotary valve 10 when it passes to a furnace. The material retained on the screen 7 is fed to a valve 11 whence it is passed on to a belt conveyor 12. From conveyor 12 the material is fed through another rotary valve 13 into a duct 14 into which hot flue gases having a temperature of approximately 260° C. are also led from a furnace (not shown). The gases and entrained wet bagasse are drawn forward by means of a fan 15 into a flash drier 16 and thence along a duct 16a into a cyclone 17 which is furnished with a rotary valve 18. In this flash drier and associated equipment the moisture content of the bagasse is reduced from about 50% to about 20% by weight.

The partially dried material is now ready for treatment with fungicidal acid. After passing the rotary valve 18 it falls freely in a pipe 24 into which atomised fungicidal acid is introduced. The atomised fungicidal acid is derived from a reservoir 19 of acid or solution of acid and a reservoir of compressed air 20 both of which reservoirs are provided with supply lines leading to a spray gun 21 furnished with a needle control valve 22. The amount of acid supplied to the partially dried bagasse can be controlled by manual adjustment of the needle valve 22. After falling freely past the spray gun the partially dried treated bagasse falls on to a belt conveyor 23 whence it passes to bundling and storage.

The bagasse when so treated may be stored for any desired period of time but it is contemplated that it shall be used after not more than about 12 months storage. When withdrawn from storage the material is chopped to the particle size desired for particle board fabrication and, with or without intermediate storage, is further dried to reduce the moisture content to 2-5%, preferably about 3%, by weight. The drying plant may consist of a fan 15, flash drier 16, duct 16a and cyclone 17. The material is next submitted to a further separating step designed to separate sufficient fine material for board surfacing after which the fine and coarse materials are separately treated with a resinous glue in known manner, the glued material spread and pressed in a suitable press under conditions which cure the resin glue used.

The fibrous dried chips of bagasse consist essentially of the tough hard substantially parallel fibres of cellulose which constitute the outer sheath of sugar cane. These fibres are held together by incrusting materials, mainly of a ligneous character, which it is not desirable to separate but are susbtantially free from the inner pith of sugar cane.

To determine the pH of treated or untreated bagasse a 4 gram sample of finely divided material is taken and shaken with 100 ccs. of distilled water for 2 minutes. The pH of the resulting suspension is then determined using a calomel/glass electrode pH meter.

I claim:

1. A process for the stabilisation of bagasse against mycelial deterioration in storage which comprises substantially uniformly treating bagasse having a moisture content of less than 50% by weight with a non-toxic fungicidal acid in the liquid phase in such an amount as to reduce the pH of the treated bagasse to 4.5 or below.

2. A process as claimed in claim 1 in which the pH of the bagasse is reduced to within the pH range 4.5 to 3.5.

3. A process as claimed in claim 1 in which the non-toxic fungicidal acid is a fungicidal alkane monocarboxylic acid which is liquid at room temperature and is miscible with water.

4. A process as claimed in claim 1 in which the non-toxic fungicidal acid is an alkane monocarboxylic acid selected from the group consisting of formic, acetic and propionic acids.

5. A process as claimed in claim 1 in which the moisture content of the bagasse before treatment is 20–40% of the weight thereof.

6. A process as claimed in claim 1 in which bagasse having a moisture content within the range of 15 to 50% by weight thereof is treated with a non-toxic fungicidal alkane monocarboxylic acid selected from the group consisting of formic, acetic and propionic acids in an amount within the range of 1 to 3% by weight.

7. A process as claimed in claim 6 in which the bagasse is in the form of fibrous chips.

8. A process as claimed in claim 7, wherein said treating is carried out by spraying said acid into said chips.

References Cited
UNITED STATES PATENTS

| | | | |
|---|---|---|---|
| 2,992,155 | 7/1961 | Okuno | 162—96 X |
| 3,216,886 | 11/1965 | Katzen | 162—96 X |
| 2,899,350 | 8/1959 | Birdseye | 162—96 X |
| 1,813,632 | 7/1931 | Munroe et al. | 162—161 X |

S. LEON BASHORE, Primary Examiner

A. L. CORBIN, Assistant Examiner

U.S. Cl. X.R.

162—80, 96, 161